United States Patent
Dasgupta (10) Patent No.: US 12,241,763 B2
(45) Date of Patent: Mar. 4, 2025

(54) ELECTROMAGNETIC FLOWMETER

(71) Applicant: ABB Schweiz AG, Baden (CH)

(72) Inventor: Subhashish Dasgupta, Bangalore (IN)

(73) Assignee: ABB Schweiz AG, Baden (CH)

( * ) Notice: Subject to any disclaimer, the term of this patent is extended or adjusted under 35 U.S.C. 154(b) by 202 days.

(21) Appl. No.: 17/841,787

(22) Filed: Jun. 16, 2022

(65) Prior Publication Data
US 2022/0307879 A1     Sep. 29, 2022

Related U.S. Application Data

(63) Continuation of application No. PCT/IB2020/061576, filed on Dec. 7, 2020.

(51) Int. Cl.
*G01F 1/58*     (2006.01)

(52) U.S. Cl.
CPC .............. *G01F 1/584* (2013.01); *G01F 1/588* (2013.01)

(58) Field of Classification Search
None
See application file for complete search history.

(56) References Cited

U.S. PATENT DOCUMENTS

| | | | |
|---|---|---|---|
| 2005/0178455 A1* | 8/2005 | Cancade | F16L 55/027 138/39 |
| 2008/0060447 A1* | 3/2008 | Lincoln | G01F 1/586 73/861.11 |
| 2013/0306183 A1* | 11/2013 | Sawchuk | F15D 1/02 138/44 |
| 2017/0370385 A1 | 12/2017 | Reckner et al. | |

FOREIGN PATENT DOCUMENTS

DE     102014113406 A1     3/2016

OTHER PUBLICATIONS

European Patent Office, International Search Report in International Patent Application No. PCT/IB2020/061576, 3 pp. (Mar. 19, 2021).
European Patent Office, Written Opinion in International Patent Application No. PCT/IB2020/061576, 6 pp. (Mar. 19, 2021).

\* cited by examiner

*Primary Examiner* — Patrick Assouad
*Assistant Examiner* — Mark A Shabman
(74) *Attorney, Agent, or Firm* — Leydig, Voit & Mayer, Ltd.

(57) ABSTRACT

An electromagnetic flowmeter for monitoring a flow rate of a fluid includes a conduit and an electromagnetic assembly coupled to the conduit to generate a magnetic field inside the conduit. A ring assembly modifies a velocity profile of fluid arranged on an inner liner wall of the conduit. A position of the ring assembly is adjustable along the inner liner wall to varyingly reform the velocity profile of the fluid. A pair of electrodes mounted to the conduit detects induced voltage generated within the reformed fluid due to the magnetic field. The flow rate of the fluid is determined based on the induced voltage.

11 Claims, 5 Drawing Sheets

ELECTROMAGNETIC FLOWMETER

CROSS-REFERENCE TO RELATED APPLICATIONS

This patent application claims priority to International Patent Application No. PCT/IB2020/061576, filed on Dec. 7, 2020, which claims priority to Indian Application No. 201941054155, filed on Dec. 27, 2019, both of which are incorporated herein in their entireties by reference.

FIELD OF THE DISCLOSURE

The present disclosure generally relates to an electromagnetic (EM) flowmeter and, more particularly, and electromagnetic flowmeter that is adjustable to reform distorted velocity profiles of a fluid that flows along a conduit of the EM flowmeter.

BACKGROUND OF THE INVENTION

Electromagnetic flowmeters are devices used for flowrate measurement of a fluid. The EM flowmeters are simple in construction, have minimal invasiveness and can handle corrosive fluids. However, in certain scenarios, field performance of the EM flowmeters may be inaccurate because field conditions in which the EM flowmeters operate could be very different than laboratory conditions under which the EM flowmeters are tested. Reduced measurement accuracy of the flow measurements in the field conditions may be because of the distortion of the flow of the fluid by upstream features (or piping disturbances), such as, but not limited to, bends, valves, elbows and T-junctions.

The EM flowmeters measure differential electromotive forces induced in moving fluid, which are proportional to velocity profile of the moving fluid.

The velocity profile in a conduit may be a function of forces, such as, inertial force and friction force. For example, at exit of an elbow (a piping component) that changes the direction of flow, the inertial forces predominate, often producing severely distorted velocity profiles. Further, in an example, as distance from the elbow increases, the friction force becomes more dominant which dissipate strain in the conduit caused by the inertial forces producing severely distorted velocity profiles. Such distorted velocity profiles of the fluid may cause errors in electrical signals generated by electrodes of the EM flowmeter.

Consequently, the distorted velocity profiles of the fluid affect the accuracy of the flowrate measurement of the fluid. However, measurement of the accurate flowrate may be critical in industrial processes to ensure optimization of such industrial processes and flowrate measurement by the EM flowmeters in presence of the distorted velocity profiles of the fluid may adversely impact such industrial processes.

BRIEF SUMMARY OF THE INVENTION

In one general aspect, the present disclosure provides an EM flowmeter that may comprise an adaptable ring assembly to reform distorted velocity profiles of fluid for accurate flowrate measurement.

In another general aspect, the present disclosure describes an adaptable ring assembly for an EM flowmeter that is cost efficient and simplistic in structure to maintain flowmeter performance standards under field conditions.

The present disclosure provides an electromagnetic (EM) flowmeter and a method for providing accurate fluid flow rate (or fluid flow velocity profile) measurements where the fluid flows internally through a conduit, in accordance with various embodiments. The present disclosure provides an EM flowmeter with a novel accessory (i.e., a ring assembly) to maintain performance standards (velocity profile and flow rate measurement accuracy) of the EM flowmeter under field conditions.

The ring assembly of the EM flowmeter may be an adjustable feature of the EM flowmeter to reform the distorted flow velocity profiles of the fluid into axially symmetric flow velocity profiles of the fluid because accuracy of the flowrate measurement using the EM flowmeter depends on axial symmetry of the flow velocity profile of the fluid where axis of symmetry coincides typically with geometric center of the conduit.

In accordance with an embodiment, the ring assembly of the EM flowmeter may be simple in construction. In accordance with an embodiment, the ring assembly of the EM flowmeter may be adjustable to minimize pressure drop in the conduit. In accordance with an embodiment, the EM flowmeter may function as a regular flowmeter and a flow modified flowmeter that reduces inventory cost. In accordance with an embodiment, the EM flowmeter may be operable, based on customer requirements for desired combination of outcome in terms of measurement accuracy, signal strength, and pressure drop.

Embodiments of the disclosure provide an electromagnetic flowmeter for monitoring a flow rate of a fluid. The electromagnetic flowmeter includes a conduit for facilitating a flow of the fluid, an electromagnetic assembly coupled to the conduit and adapted to generate a magnetic field inside the conduit, a ring assembly, and a pair of electrodes. The ring assembly is to modify a velocity profile of the fluid arranged on an inner liner wall of the conduit. A position of the ring assembly is adjustable along the inner liner wall of the conduit at a predetermined distance to varyingly reform the velocity profile of the fluid based on the position of the ring assembly. The pair of electrodes are mounted to the conduit and disposed downstream of the ring assembly. The pair of electrodes detects induced voltage generated within the reformed fluid due to the magnetic field. Further, the flow rate of the fluid is determined based on the induced voltage.

In accordance with the embodiment, the ring assembly includes a ring and one or more sliders. The ring is adapted to slide inside the conduit. Further, the one or more sliders are attached to the ring and extend substantially parallel to a central axis of the ring. The one or more sliders facilitate the sliding of the ring within the conduit.

In accordance with the embodiment, the inner liner wall of the conduit defines one or more grooves extending substantially parallel to a central axis of the conduit from an end of the conduit to receive the one or more sliders.

In accordance with an embodiment, the one or more sliders are removably coupled to the ring.

In accordance with an embodiment, the predetermined distance is a distance between the ring assembly and a plane of the pair of electrodes.

In accordance with an embodiment, the predetermined distance is calculated by using a virtual model.

In accordance with an embodiment, the virtual model determines the distance between the ring assembly and the plane of the pair of electrodes and a height of a ring of the ring assembly based on one or more operational states.

In accordance with an embodiment, the ring assembly is disposed upstream of the electromagnetic assembly.

In accordance with an embodiment, the pair of electrodes is disposed diametrically opposite to each other.

In accordance with an embodiment, the electromagnetic assembly includes one or more coils for generating magnetic field inside the conduit.

Without limiting the scope of the invention, the electromagnetic flowmeter is capable of generating an accurate fluid flow rate data using the ring assembly that reforms a distorted velocity flow profile of a fluid. The ring assembly may correspond to a ring assembly which is simple in structure and may be easy to configure. Moreover, the ring assembly may also help in minimizing pressure drop of fluid column. Further, the ring assembly may be equipped with sliders that enable the ring assembly to slide inside conduit of the EM flowmeter. The ring assembly is fit into a plurality of grooves cut on an inner liner of the conduit. Further, the ring assembly may be based on dimensions and dimension ratios that are optimized using a digital twin of the EM flowmeter. In some example embodiments, a user may specify desired outcome corresponding to measurement accuracy, pressure drop or flow rate signal strength. This provides flexibility to the user as the EM flowmeter and the ring assembly may be adjusted based on the user specification. The ring assembly may also be created within the EM flowmeter. This may reduce inventory cost as the same EM flowmeter may be capable of functioning as the ring assembly.

BRIEF DESCRIPTION OF THE SEVERAL VIEWS OF THE DRAWING(S)

Having thus provided a summary of the present disclosure in general terms, reference will now be made to the accompanying drawings, which are not necessarily drawn to scale.

DETAILED DESCRIPTION OF THE INVENTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatus and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. The use of any term should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

An electromagnetic (EM) flowmeter and a method for modifying a velocity profile of a fluid are provided herein in accordance with example embodiments. The EM flowmeter and the method disclosed herein provide measures to reform a distorted velocity profile of a fluid flowing through the EM flowmeter for ensuring generation of accurate flowrate data that may be critical for various industrial processes, such as, but not limited to, waste-water management processes and pharmaceutical industries.

Figure 1:
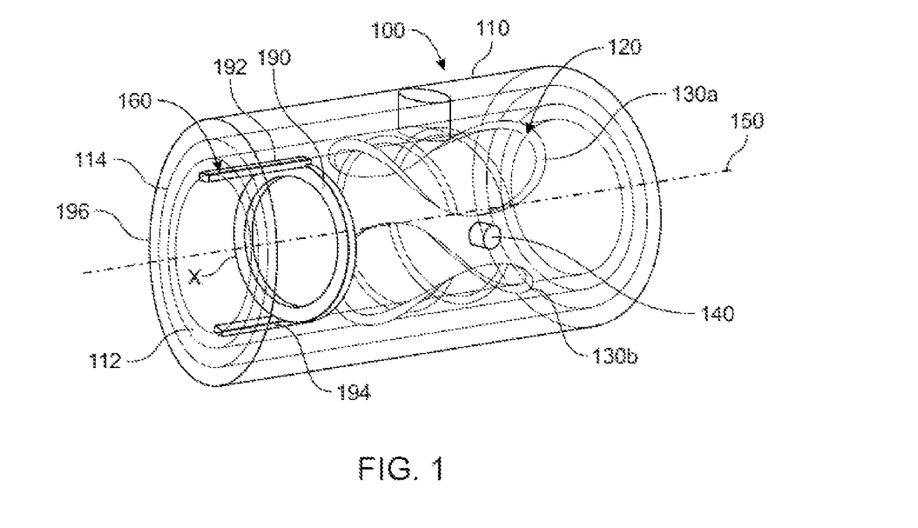
FIG. 1 illustrates a schematic diagram of an exemplary electromagnetic flowmeter having a ring assembly, in accordance with an embodiment of the disclosure.
Figure 2A:
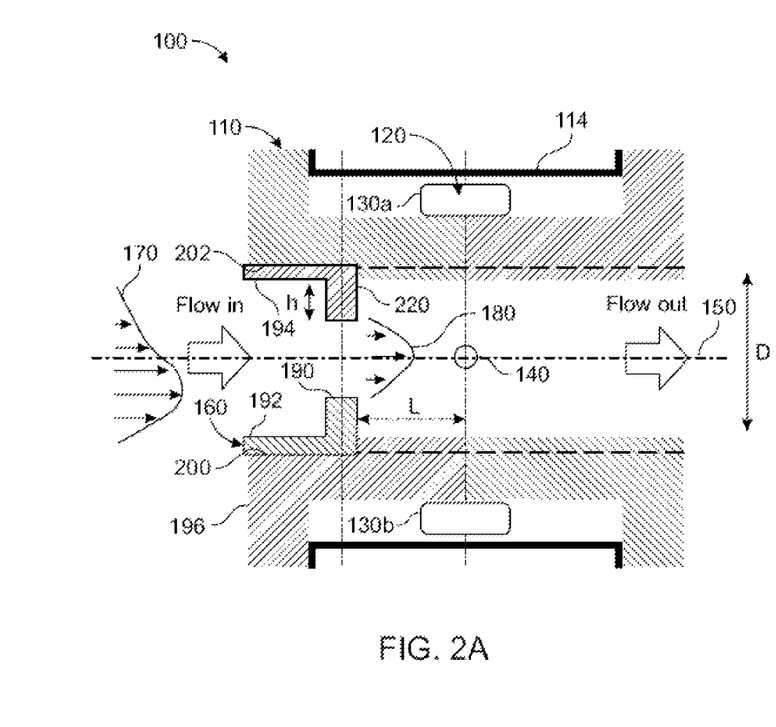
FIG. 2A illustrates a section schematic diagram of the electromagnetic flowmeter of FIG. 1, in accordance with an embodiment of the disclosure.

Referring to FIGS. 1 and 2A, an exemplary electromagnetic (EM) flowmeter 100 suitable for measuring a flow rate of a fluid is shown. The EM flowmeter 100 includes a conduit 110 having an inner liner wall 112 and a casing 114 disposed around the inner liner wall 112, an electromagnetic assembly 120, and a pair of electrodes 140. The conduit 110 facilitates a flow of fluid whose flow rate is to be determined or measured and may correspond to an insulating pipe. In an embodiment, the conduit 110 may be a non-magnetic insulating pipe. In an embodiment, the inner liner wall 112 may be provided or coated with an insulating layer to prevent electrical shorting due to generation of induced voltage within the EM flowmeter 100.

Further, the electromagnetic assembly 120 is attached to the conduit 110 to generate a magnetic field inside the conduit 110. In the illustrated embodiment, the electromagnetic assembly 120 may include a pair of magnetic coils, for example, a first magnetic coil 130a and a second magnetic coil 130b disposed diametrically opposite to the first magnetic coil 130a. In an embodiment, the first magnetic coil 130a and the second magnetic coil 130b may wrap around a portion of the inner liner wall 112 and may be disposed/sandwiched between the inner liner wall 112 and the casing 114. The casing 114 may be an insulating layer which is made of a magnetic material to enclose the generated magnetic field. Also, in certain implementations, the magnetic coils 130a, 130b may be disposed or mounted to the conduit 110 such that a direction of the magnetic field inside the conduit 110 is substantially perpendicular to a central axis 150 of the conduit 110 or a direction of flow of fluid inside the conduit 110. Moreover, the direction of the magnetic field inside the conduit 110 may also be perpendicular to a transverse axis along which the pair of electrodes 140 is arranged in the conduit 110.

Also, the pair of electrodes 140 may be attached to the conduit 110 to measure any induced voltage generated within the fluid flowing through the conduit 110. The voltage may be induced by the magnetic field generated by the pair of magnetic coils 130a, 130b as the magnetic field interacts with flowing conductive fluid in the conduit 110. The induced voltage generated in the fluid flowing inside the conduit 110 may be proportional to a velocity of the fluid and to the magnetic field strength. In an implementation, the induced voltage available at the pair of electrodes 140 is the result of contributions of voltage generated at any point within the conduit 110 through a vectorial cross product of the magnetic field strength and the flow velocity of the fluid moving inside the conduit 110. The flowrate of the fluid may be determined by the EM flowmeter 100 based on the induced voltage. Induced voltage is proportional to a product of magnetic field (generated by the pair of magnetic coils 130a, 130b) and the flow velocity (determined from a velocity profile of the fluid). It is generally assumed that magnetic field strength generated by the pair of magnetic coils 130a, 130b is linearly proportional to a current flowing in the pair of magnetic coils 130a, 130b. Thus, output signal may be proportional to the product of the current and the flow velocity (determined from the velocity profile of the fluid inside the conduit 110). In a preferred embodiment, the pair of electrodes 140 may be positioned such that the induced voltage may be measured after the velocity profile of the fluid is reformed or modified.

Before entering the conduit 110, the fluid whose flow rate is to be monitored may pass through various bends, turns, reductions, and enlargements which affect a velocity profile of the fluid. Further, whirling eddies or vortices generated with the fluid may also distortions in the velocity profile of the fluid. In certain scenarios, the EM flowmeter 100 may be located immediately downstream of an elbow or obstruction in a flowline of an industrial plant, thereby distorting velocity profile of the fluid received by the conduit 110. To combat all the problems related to the distorted velocity profile of the fluid in the conduit 110, the EM flowmeter 100 includes a flow reformer or a ring assembly 160 arranged inside the conduit 110 and upstream of the electromagnetic assembly 120. The ring assembly 160 is arranged on the inner liner wall 112 of the conduit 110 to modify the velocity profile of the fluid flowing through the conduit 110. FIG. 2A shows a distorted velocity profile of fluid 170 before passing through the ring assembly 160, and an axially symmetric velocity profile of the fluid 180 after passing through the ring assembly 160.

As shown, the ring assembly 160 may include a ring 190 slidably disposed inside the conduit 110 and upstream of the electromagnetic assembly 120. A position of the ring 190 is adjusted to change a distance between the ring 190, and hence the ring assembly 160, and a plane of the pair of electrodes 140. The distance is changed to adaptively modify the velocity profile of the fluid passing through the ring assembly 160. As shown, the ring 190 may be provided with a height 'h' that extends uniformly from inner liner wall 112 of the conduit 110 towards center of the conduit 110. In accordance with an embodiment, a wall thickness of the ring 190 may be held constant across the height 'h'. For a ring-shaped feature, the height 'h' may correspond to a difference between an outer diameter of the ring 190 and an inner diameter of the ring 190. Therefore, a shape and size of the ring assembly 160 may depend on the height 'h' and the inner diameter of the ring 190. The dimension 'h' of the ring 190, and the distance may be selected to suitably optimize the distorted velocity profile 170 of the fluid flowing upstream of the ring 190 to the axially symmetric velocity profile 180 of the fluid that flows downstream of the ring assembly 160 (i.e. the ring 190). According to some embodiments, the height 'h' and the length are selected by using a virtual model, such as digital twin technology, which is further explained with reference to FIG. 6. The selected height 'h' and length are determined based on geometric ratios, such as height ratio and length ratio. The height ratio (h/D) may correspond to ratio of height 'h' of the ring 190 and an inner diameter 'D' of the conduit 110 (or inner diameter of the EM flowmeter 100). The length ratio (L/D) may correspond to ratio of the distance between the ring 190 (i.e. the ring assembly 160) and the plane of the pair of electrodes 140 and the inner diameter 'D' of the conduit 110.

Additionally, or optionally, the dimensions 'h' and may also be selected to optimize a pressure drop inside the conduit 110, and induced voltage generated within the fluid flowing through the conduit 110 and measured by the pair of electrodes 140. The optimized pressure drop and the induced voltage may be predicted by using the digital twin technology. The digital twin technology may perform a parametric study on the geometric ratios, i.e. (h/D) and (L/D) to assess impact of changing the dimensions, h and L so as to reform the distorted fluid velocity flow profile and generate accurate flowrate data. The parametric study may generate various parameter ranges for the geometric ratios, (h/D) and (L/D) for flow rate conditions, such as, but not limited to, flowrate of the fluid, pressure drop, and fluid viscosity. The geometric ratios, (h/D) and (L/D) are optimized to ensure the outcome of generating the accurate flowrate data, the optimized pressure drop and the EMF signal. The height ratio (h/D) is also referred to as dimensionless height ratio of the ring assembly 160. The length ratio (L/D) is also referred to as characteristic dimensionless length ratio of the ring assembly 160. The optimum geometric ratios (i.e. height and length ratios) may be determined based on characteristic curves that are obtained from a digital twin (or a digital replica) of an EM flowmeter. The characteristic curves for determining optimum geometric ratios will be illustrated and described with reference to FIGS. 5A and 5B.

Figure 2B:
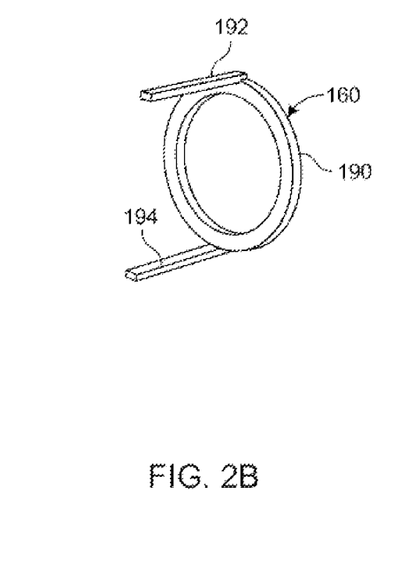
FIG. 2B illustrates a perspective view of the ring assembly of the electromagnetic flowmeter of FIG. 1, in accordance with an embodiment of the disclosure.

Referring to FIG. 2A and FIG. 2B, the ring assembly 160 may further include one or more sliders, for example, a first slider 192 and a second slider 194, attached to the ring 190 to facilitate a sliding movement of the ring 190 inside the conduit 110 along the central axis 150 of the conduit 150. Therefore, the sliders 192, 194 facilitate sliding of the ring 190 along the length of the conduit 190 to change the distance 'L' between the ring 190, and hence the ring assembly 160, and the plane of the pair of electrodes 140. In an embodiment, each of the sliders 192, 194 may be disposed substantially parallel to the central axis 150 and may extend from the ring 190 to an end 196 of the conduit 110. In an embodiment, each of the sliders 192, 194 may include a rectangular structure and are adapted to be disposed inside the grooves 200, 202 defined by the inner liner wall 112. As with the sliders 192, 194, each of the grooves 200, 202 extend substantially parallel to the central axis 150 along a portion of the length of the conduit 110. In an embodiment, each of the grooves 200, 202 may extend from the end 196 towards the electromagnetic assembly 120. In an embodiment, the dimensions of the grooves 200, 202 may be complimentary to the dimensions of the sliders 192, 194. In this manner, the sliders 192, 194 when disposed inside the respective grooves 200, 202 are flush with an inner surface of the conduit 110. In certain implementations, the sliders 192, 194 may be removably attached to the ring 190. In such case, the sliders may be removed from the conduit 110 after positioning the ring 160 at a suitable or desired location. Further, in such a case, the grooves 200, 202 may be omitted.

In operation, the conduit 110 receives the fluid for measuring the flow rate of the fluid. As the fluid flows through the ring 190 (i.e. the ring assembly 160), the velocity profile of the fluid is reformed or modified. For example, an incoming distorted velocity profile, such as the velocity flow profile 170 is reformed by the ring 190, and hence the ring assembly 160, to generate a reformed velocity flow profile, for example, the axially symmetric velocity flow profile 180. The reformed velocity flow profile 180 in the EM flowmeter 100 may interact with the magnetic field generated by the magnetic coils 130a, 130b. The interaction of the reformed velocity flow profile 180 and the generated magnetic field may generate the induced voltage within the fluid. The induced voltage is measured by the pair of electrodes 140, on the basis of which the flowrate of the fluid is generated by the EM flowmeter 100. In this manner, the EM flowmeter 100 rectify/modify the distorted velocity profile of the fluid received by the conduit 110, thereby reducing an amount of upstream piping required for more accurate measurements for the flowrate.

Figure 3:
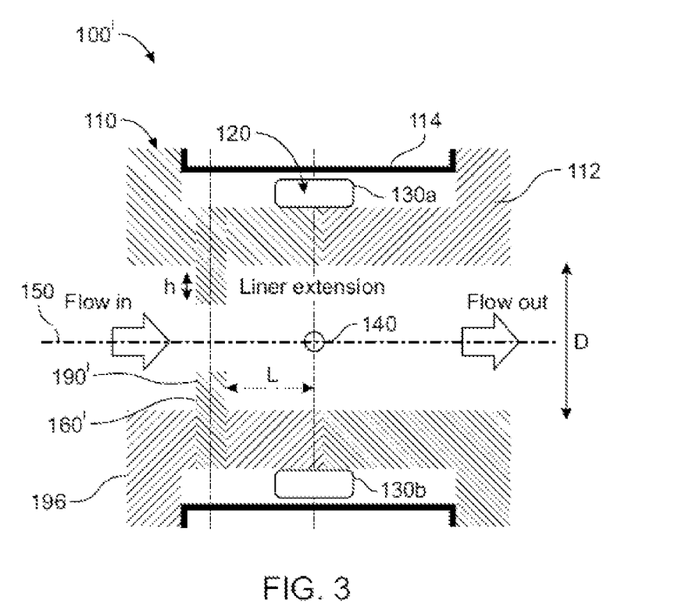
FIG. 3 illustrates a schematic sectional diagram of an electromagnetic flowmeter having a ring assembly, in accordance with an alternative embodiment of the disclosure.

FIG. 3 illustrates an exemplary EM flowmeter 100' in accordance with an alternative embodiment. The EM flowmeter 100' is similar in structure and function to that of the EM flowmeter 100 except that a ring assembly 160' of the EM flowmeter 100' is different from the ring assembly 160 of the EM flowmeter 100. Further, the elements of the EM flowmeter 100' having similar constructional and structural aspects as that of the elements of the EM flowmeter 100 will have same reference numerals. As shown, the ring assembly 160' includes only a ring 190' similar to the ring 190 and the sliders 192, 194 and the grooves 200, 202 are omitted from the ring assembly 160' and the conduit 110 respectively. Further, instead of an adjustable or slidable ring assembly, the ring 190', and hence the ring assembly 160' of the EM flowmeter 100' is integrally formed with the inner liner wall 112 and hence the ring assembly 160' (i.e. the ring 190') remains at a fixed distance relative to the pair of electrodes 140.

Figure 4:
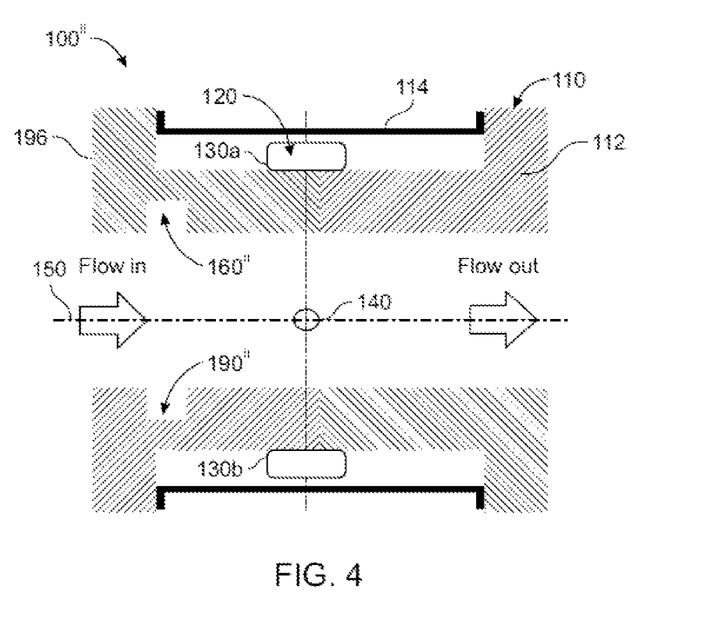
FIG. 4 illustrates a schematic sectional diagram of an electromagnetic flowmeter having a ring assembly, in accordance with a yet another alternative embodiment of the disclosure.

FIG. 4 illustrates an exemplary EM flowmeter 100" in accordance with an alternative embodiment. The EM flowmeter 100" is similar in structure and function to that of the EM flowmeter 100' except that a ring assembly 160" of the EM flowmeter 100" is different from the ring assembly 160' of the EM flowmeter 100'. Further, the elements of the EM flowmeter 100" having similar constructional and structural aspects as that of the elements of the EM flowmeter 100' will have same reference numerals. As shown, the ring assembly 160" includes a ring 190" in the form a circular recess or cutout extending from the inner surface of the inner liner wall 112 towards the casing 114 instead of a circular protrusion or a hollow disc extending inwardly towards the central axis 150 as with the ring 190' of the EM flowmeter 100'. Therefore, the ring assembly 160" of the EM flowmeter 100" is integrally formed with the inner liner wall 112 and hence the ring assembly 160" (i.e. the ring 190") remains at a fixed distance relative to the pair of electrodes 140. Further, the depth of the circular recess or cutout corresponds to a height 'h' of the ring 190".

Figure 5A:
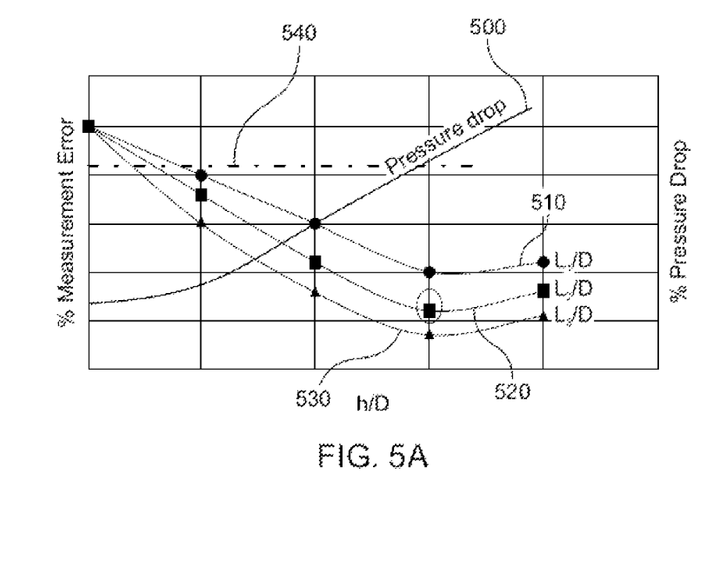
FIG. 5A illustrates a graphical representation showing a trend in pressure drop along a conduit of an electromagnetic flowmeter as a function of h/D ratio and measurement error, in accordance with an embodiment of the disclosure.

FIG. 5A illustrates a graphical representation to show a trend in pressure drop along a conduit of an EM flowmeter as a function of h/D ratio (or height ratio) and measurement error, in accordance with an embodiment.

The graphical representation illustrated in FIG. 5A depicts characteristic curves for determining an optimum value of a height ratio of a ring assembly for an EM flowmeter. The height ratio (or h/D ratio) may correspond to a ratio of height 'h' of the ring assembly and a diameter 'D' of the EM flowmeter. The length ratio may correspond to a ratio of length 'L' between the ring assembly and plane of electrodes of the EM flowmeter and the diameter 'D'. In FIG. 5A, plot 500 corresponds to pressure drop of fluid. The abscissa in FIG. 5A shows height ratio (or h/D ratio) of the EM flowmeter. The ordinate in FIG. 5A shows percent measurement error.

When value of the height ratio (h/D ratio) is high, error in measurement due to distorted velocity flow profile is less. As shown in FIG. 5A, higher the values of h/D ratio, the error decreases. Although the error decreases, the pressure drop plot 500 of the fluid flow increases. It is observed that the percent pressure drop 500 increases with increase in values of the height ratio (h/D ratio). The horizontal line 540 represents acceptable percent pressure drop. Such a value for the acceptable percent pressure drop may be obtained, for instance, from a customer or an operator as one of the specifications.

Further, in FIG. 5A, plot trend corresponding to 510, 520, and 530 shows the percent measurement error in EMF values for various lengths (or distances) between the ring assembly and the plane of the pair of electrodes. This distance is represented in terms of the geometric ratio, L/D, of normalized length where the normalization factor is the inner diameter 'D' of the conduit or diameter of the EM flowmeter. Each length ratio 510, 520, and 530 exhibits similar trend in the percent measurement error although percent measurement error values are different. Each of the plot trends corresponding to 510, 520, and 530 is obtained by fixing a characteristic dimensionless length ratio, L/D, and varying the height ratio (h/D) of the ring assembly 160, while estimating the percent measurement error.

Figure 5B:
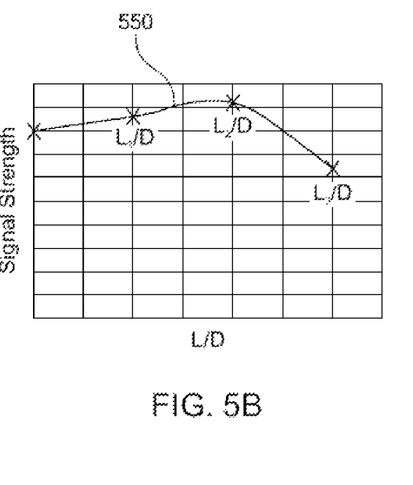
FIG. 5B illustrates a graphical representation showing signal strength as a function of L/D ratio for an electromagnetic flowmeter, in accordance with an embodiment of the disclosure.

FIG. 5B illustrates a graphical representation to show signal strength as a function of L/D ratio for an EM flowmeter, in accordance with an embodiment of the present disclosure. The graphical representation of FIG. 5B depicts a characteristic curve 550 for determining an optimum value of a length ratio of the ring assembly for the EM flowmeter.

In FIG. 5B, an estimated signal strength of the EMF is shown along the ordinate and length ratio (L/D) is shown along the abscissa. The curve 550 depicts that as values of the L/D ratio increases, EMF signal strength of an estimated EMF increases marginally. However, there is a significant drop in the EMF signal strength, beyond a certain value of the L/D ratio. As shown in FIG. 5B, the EMF signal strength drops at L3/D ratio. This EMF signal is optimized by varying values of the L/D ratios. The variation in values may be performed through the parametric study on geometric ratios of the digital twin of the EM flowmeter using the digital twin technology. From the parametric study, value of the length ratio (L/D ratio) at which the EMF signal strength for an acceptable fluid pressure drop is maximum, is selected as an optimized L/D ratio.

Thus, the characteristic curves (shown in FIGS. 5A and 5B) are plotted based on the geometric ratios (i.e. height ratio and length ratio) that are generated based on the digital twin of the EM flowmeter. An optimum value of the height ratio (h/D) and the length ratio (L/D) is obtained by using the digital twin of the EM flowmeter that is generated using the digital twin technology. For instance, value of the optimized height ratio is denoted by k1 and value of the optimized length ratio is denoted by k2. The h/D=k1 and L/D=k2 values are universal and hold for any flowmeter with diameter, D=25 to 500 mm.

Using the digital twin, a parametric study on the h/D and L/D is performed to determine the optimized geometric ratios and optimized dimensions for configuring the ring assembly. In some example embodiments, the digital twin may be determined by physics-based model. The configuration of the flow ring assembly and the EM flowmeter is further explained with reference to FIG. 6.

Figure 6:
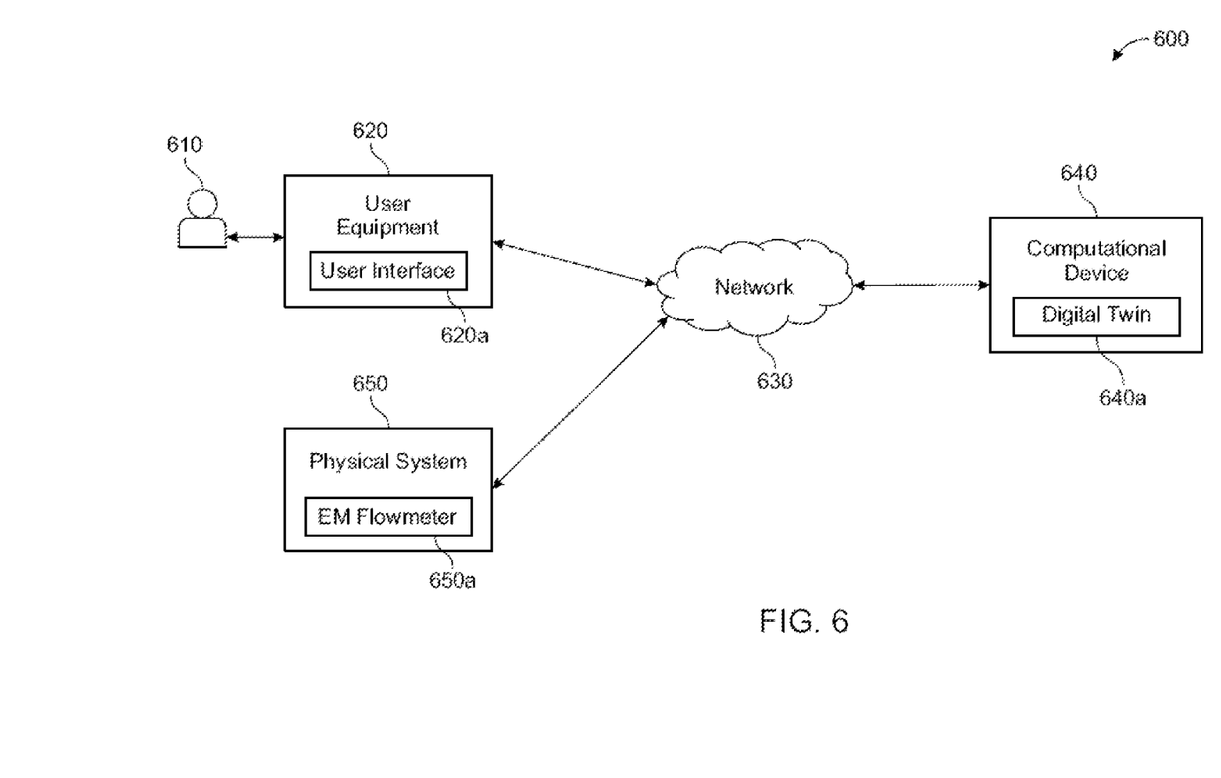
FIG. 6 illustrates a block diagram for configuring a ring assembly of an electromagnetic flowmeter adjustable to reform a distorted velocity flow profile of a fluid flowing within a conduit of the electromagnetic flowmeter, in accordance with an embodiment of the disclosure.

FIG. 6 illustrates a block diagram 600 for configuring a ring assembly of an EM flowmeter for reforming a distorted velocity flow profile of a fluid flowing within a conduit of the EM flowmeter, in accordance with an embodiment. There is shown a user 610, user equipment (UE) 620, a network 630, a computational device 640, and a physical system 650. The UE 620 may further comprise user interface 620a. The computational device 640 may further comprise a digital twin framework 640a (or a digital twin 640a). The physical system 650 may further comprise an EM flowmeter 650a. In accordance with an embodiment, the physical system 650 may be installed in an industrial automation process, such as, but not limited to, a waste water management industrial process. In accordance with an embodiment, the user 610 may be associated with the UE 620. In accordance with an embodiment, the user 610 may correspond to personnel, an operator or a customer.

As mentioned earlier, the EM flowmeter 650a may comprise a flow ring assembly. The ring assembly may be manufactured based on a height dimension 'h' and a length dimension adaptable to the EM flowmeter 650a. The height dimension and the length dimension of the ring assembly are determined such that outcome of the EM flowmeter 650a is optimized, i.e., accurate flow rate data, optimized pressure drop or optimized EMF signal strength.

In an illustrative example scenario, the user 610 provides specification for the EM flowmeter 650a to the network 630 using the UE 620. Some of the examples of the UE 620 may include, but not limited to, a desktop computer, a laptop, a mobile device or an electronic device. The specification of the EM flowmeter 650a may include, for instance, but not limited to, size of the EM flowmeter, a pre-defined range for fluid flow rate, a pre-defined accuracy level for the flow rate measurement, a pre-defined fluid pressure drop for the process conditions, a pre-determined strength of EMF signal to be measured by a pair of electrodes of the EM flowmeter 650a. According to some embodiments, the specification of the EM flowmeter 650a may be uploaded to a server (not shown in FIG. 6) or the computational device 640. The computational device 640 may be capable to support simulation processing needs associated with the EM flowmeter 650a. For instance, the specification of the EM flowmeter 650a may be uploaded to the server associated with the network 630.

The network 630 may comprise suitable logic, circuitry, and interfaces that may provide a plurality of network ports and a plurality of communication channels for transmission and reception of data. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 630 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 630 may include, but are not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

The specification of the EM flowmeter 650a may be imported to the computational device 640 from the server. The computational device 640 may include pre-configured application software to generate a digital replica, i.e. a digital twin of the EM flowmeter 650a and a simulated environment for the digital twin. In some example embodiments, the simulated environment may be defined by various operational states and characteristic features for the digital twin. The various operational states and characteristic features may be uploaded to the server via the network 630. For instance, the server may be associated with a physical system 650. In accordance with an embodiment, the user 610 associated with the UE 620 or a user associated with the physical system 650 may upload and store the various operational states and characteristic features of the simulated environment to the server. Although not explicitly shown in the figure, a gateway device could also be used to interface a manufacturing team associated with the EM flowmeter 650a with the server. The operational states and characteristic features may also define field conditions, such as conductivity of the fluid, viscosity of the fluid, density of the fluid, temperature of the fluid, pressure of the fluid, current power settings on magnetic coils, geometrical shape of the magnetic coils or characteristic properties of the conduit, such as, but not limited to, size of the conduit, material of the conduit, upstream features of the conduit, roughness of the conduit.

In some example embodiments, the digital twin 640*a* and the simulated environment of the digital twin 640*a* are created using a physics based digital replication tool, combined with mathematical techniques to optimize dimensions (i.e., h and L) and geometric ratios (h/D and L/D) of the ring assembly. Various techniques may be adopted for the simulation. For example, the digital twin 640*a* and the simulated environment may be generated using a finite element analysis (FEA) or reduced basis finite element analysis (RB-FEA). Aspects related with magnetism and induced EMF may be modeled for the digital twin using techniques such as solving Maxwell's equations. Fluid flow related properties or conditions for the simulated environment may be defined using techniques, such as, Navier-Stokes equations and conservation equations of mass, momentum, and energy.

The computational device 640 uses the digital twin 640*a* to determine dimensions (such as the height and the length dimension) for a ring assembly of the EM flowmeter 650*a*. The digital twin 640*a* solves physics-based equations relating to magnetism (such as the Maxwell's equations) and flow dynamics (such as Navier-Stokes equation) and predicts outcome of the EM flowmeter 650*a*, such as, but not limited to, flow rate accuracy, pressure drop and EMF signal strength. In some example embodiments, the computational device 640 performs a parametric study using the digital twin 640*a*. The parametric study is performed on the geometric ratios, i.e. height ratio (h/D) and length (or distance) ratio (L/D). Various parameter ranges for the h/D and L/D for any given flow rate conditions, such as flow rate, pressure drop, fluid viscosity, or the like are generated based on the parametric study. As described in FIGS. 5A and 5B, the parameter ranges are plotted into graphical representation that depicts characteristics curves for determining an optimum value of the height ratio and the length ratio. Using mathematical techniques (such as FEA, RB-FEA, and gradient-optimization) integral to the digital twin, the ratios h/D and L/D are optimized, ensuring to meet the specification of the EM flowmeter 650*a* specification provided by the user 610. From the optimized geometric ratios, dimensions of the ring assembly, i.e., the height 'h' and the length 'L' are selected. The optimized dimensions are communicated to the manufacturing team for manufacturing and assembling the EM flowmeter 650*a* and the ring assembly of the EM flowmeter 650*a*.

In this way, example embodiments of the disclosure may result in reforming a distorted velocity flow profile of a fluid with ring assembly of an EM flowmeter to generate accurate fluid flow rate data. The ring assembly may correspond to a ring assembly which may be easy to configure due to simplicity in structure. The ring assembly may also help in minimizing pressure drop of fluid. The ring assembly (e.g., the ring assembly 160) is equipped with sliders that enable the ring assembly to slide inside conduit of the EM flowmeter and fit the ring assembly into a plurality of grooves cut on an inner liner of the conduit. Further, the ring assembly may be configured based on dimensions and dimension ratios that are optimized using a digital twin of the EM flowmeter. This provides flexibility to a user specify desired outcome corresponding to measurement accuracy, pressure drop or signal strength. Moreover, the ring assembly may be configured within the EM flowmeter as illustrated in FIG. 3 and FIG. 4. This reduces inventory cost as the same EM flowmeter may be capable of functioning as the ring assembly. In case of availability of a smooth upstream conduit/pipe, the user 610 need not opt for an independent ring assembly. In such a case, the calibration factor of the EM flowmeter may be tested without the ring assembly. This way the necessity of developing different variations (full bore or reduced bore flowmeter) of similar sized flowmeters may be avoided, while saving inventory cost.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electromagnetic flowmeter for monitoring a flow rate of a fluid, the electromagnetic flowmeter comprising:
   a conduit for facilitating a flow of the fluid;
   an electromagnetic assembly coupled to the conduit and adapted to generate a magnetic field inside the conduit;
   a ring assembly to modify a velocity profile of the fluid arranged on an inner liner wall of the conduit, the ring assembly comprising one or more sliders attached to a ring and extending substantially parallel to a central axis of the ring, wherein a position of the ring assembly is adjustable along the inner liner wall of the conduit at a predetermined distance to varyingly reform the velocity profile of the fluid based on the position of the ring assembly, and wherein the one or more sliders facilitate sliding of the ring against the inner liner wall of the conduit; and
   a pair of electrodes mounted to the conduit and disposed downstream of the ring assembly, the pair of electrodes detecting an induced voltage generated within the reformed fluid due to the magnetic field, wherein the flow rate of the fluid is determined based on the induced voltage.

2. The electromagnetic flowmeter recited in claim 1, wherein the ring assembly comprises the ring adapted to slide inside the conduit, wherein the one or more sliders facilitate the sliding of the ring against the inner liner wall of the conduit within the conduit.

3. The electromagnetic flowmeter recited in claim 2, wherein the inner liner wall of the conduit defines one or more grooves extending substantially parallel to the central axis of the conduit from an end of the conduit to receive the one or more sliders.

4. The electromagnetic flowmeter recited in claim 2, wherein the one or more sliders is/are removably coupled to the ring.

5. The electromagnetic flowmeter recited in claim 1, wherein the predetermined distance is a distance between the ring assembly and a plane of the pair of electrodes.

6. The electromagnetic flowmeter recited in claim 1, wherein the predetermined distance is calculated using a virtual model.

7. The electromagnetic flowmeter recited in claim 6, wherein the virtual model determines the distance between the ring assembly and the plane of the pair of electrodes and a height of a ring of the ring assembly based on one or more operational states.

8. The electromagnetic flowmeter recited in claim 1, wherein the ring assembly is disposed upstream of the electromagnetic assembly.

9. The electromagnetic flowmeter recited in claim 1, wherein the pair of electrodes is disposed such that each of the pair of electrodes is disposed diametrically opposite relative to the other.

10. The electromagnetic flowmeter recited in claim 1, wherein the electromagnetic assembly comprises one or more coils for generating magnetic field inside the conduit.

11. The electromagnetic flowmeter recited in claim 1, wherein the ring assembly comprises the ring in contact with the inner liner wall of the conduit.

* * * * *